United States Patent [19]
Ghisolfi

[11] Patent Number: 5,243,020
[45] Date of Patent: Sep. 7, 1993

[54] PROCESS FOR THE CONTINUOUS PRODUCTION OF HIGH MOLECULAR WEIGHT POLYESTER RESIN

[75] Inventor: Guido Ghisolfi, Tortona, Italy
[73] Assignee: Phobos N.V., Netherlands
[21] Appl. No.: 690,895
[22] PCT Filed: Oct. 12, 1990
[86] PCT No.: PCT/NL90/00152
  § 371 Date: Jul. 2, 1991
  § 102(e) Date: Jul. 2, 1991
[87] PCT Pub. No.: WO91/05815
  PCT Pub. Date: May 2, 1991

[30] Foreign Application Priority Data
Oct. 13, 1989 [EP] European Pat. Off. ........... 89119049

[51] Int. Cl.$^5$ .................. C08G 63/20; C08G 63/78; C08J 11/06
[52] U.S. Cl. .................. 528/272; 528/308; 528/308.2; 525/437; 525/444
[58] Field of Search .......... 525/437, 444; 528/272, 528/308, 308.2

[56] References Cited

U.S. PATENT DOCUMENTS

| | | | |
|---|---|---|---|
| 3,553,157 | 1/1971 | Dijkstra | 524/425 |
| 4,132,707 | 1/1979 | Borman | 525/444 |
| 4,436,782 | 3/1984 | Ho | 528/308.1 |
| 4,680,345 | 7/1987 | Kabayashi et al. | 528/491 |
| 4,772,649 | 9/1988 | Andrews et al. | 528/288 |

*Primary Examiner*—John Kight, III
*Assistant Examiner*—Jeffrey Culpeper Mullis
*Attorney, Agent, or Firm*—Sughrue Mion Zinn Macpeak & Seas

[57] ABSTRACT

The intrinsic viscosities have been determined on a solution of 0,5 g. of polyester pellets into 100 ml. of solution phenol/tetrachloroethane with a weight ratio of 60:40 at a temperature of 25° C. The free acetaldehyde content has been determined with gas chromatographic methods previously described in DE-OS 2834 162.

The content of the acetaldehyde within the container ("head-space methods") has been determined using the method described in U.S. Pat. No. 4,764,323.

13 Claims, No Drawings

PROCESS FOR THE CONTINUOUS PRODUCTION OF HIGH MOLECULAR WEIGHT POLYESTER RESIN

The present invention relates to a process for the production of high molecular weight polyester resin from polyester resin having a lower molecular weight.

Particularly, the invention relates to a process in which the polyester resin is blended in a molten state with an additive adapted to accelerate the achievement of high viscosity, transformed into a granulate and then treated in a solid state polycondensation reactor.

Such a process is known U.S. Pat. No. 4,147,738 in which the additive is an aromatic polycarbonate. In this known process the accelerating agent is blended with a branched copolyester.

From U.S. Pat. No. 4,132,707 is known to blend a branching component with poly (1,4-butylene terephthalate) (PBT) or with mixtures of polyethyleneterephthalate (PBT) and PBT in order to obtain branched copolyester having a suitably high melt viscosity.

The object of the present invention is to provide a new process with which it is possible to obtain a higher increase of the upgrading kinetic of the solid state polycondensation if compared with the kinetic of the known processes.

According to the invention, this object is achieved by blending the resin with a dianhydride of an aromatic tetracarboxylic acid.

The dianhydride is preferably selected from the group consisting of pyromellitic dianhydride, benzophenone dianhydride, 2,2-bis (3,4-dicarboxyphenyl) propane dianhydride, 3,3', 4,4'-biphenyltetracarboxylic acid dianhydride, bis (3,4-dicarboxyphenyl) ether dianhydride, bis (3,4-dicarboxyphenyl) thioether diahydride, bisphenol A bisether dianhydride, 2,2-bis (3,4-dicarboxylphenyl) hexafluoropropane dianhydride, 2, 3, 6, 7-naphtalenetetracarboxylic acid dianhydride, bis (3,4-dicarboxyphenyl) sulfone dianhydride, 1, 2, 5, 6-naphthalenetetracarboxylic acid dianhydride, 2,2', 3,3'-biphenyltetracarboxylic acid dianhydride, hydroquinone bisether dianhydride, bis (3,4-dicarboxyphenyl) sulfoxide dianhydride, 3, 4, 9, 10-perylene tetracarboxylic acid dianhydride and mixtures thereof.

The dianhydride is most preferably pyromellitic dianhydride, 3,3', 4,4' benzophenonetetrocarboxylic acid dianhydride and mixtures thereof.

Particularly preferred is the use of pyromellitic dianhydride (PMDA).

With the term "polyester resin" are also intended copolyester resin. The process is particularly advantageous for alkylene terephtalates and copoly (alkylene terephtalates) utilized for injection molding, blow molding, extrusion and which are useful in the production of yarn obtained by melt spinning.

The blending of polyester resin with dianhydride is preferably performed in a counter-rotating non-intermeshing vented twin screw extruder at a temperature between 200° and 350° C., depending from the melting point of the polymer or copolymer.

The use of such kind of extruder allows to perform a good distribution of dianhydride in the melt and to avoid problems of local high concentrations of dianhydride due to its high reactivity. The mixing effect of this kind of extruder approaches exponential performance and allows to use very short residence time in the extruder.

The process according to the invention is particularly indicated for the production of high viscosity PET or COPETs. The known processes have the drawback that the upgrading time (that is the residence time in the solid state polycondensation reactor), which is required by a given solid state temperature, is extremely long also with higher solid state temperatures. However, the use of higher temperatures such as 220° C. is limited only for PET or COPETs which have a melt temperature $\geq$250° C. The solid state treatment of COPETs with melting temperature below 250° C. is only possible in the continuous polycondensation process using reaction temperature lower than 200° C. This requires a residence time of the product in the solid state polycondensation reactor of 15–38 hours in order to obtain a final intrinsic viscosity of 0.8–1.1 dl/g starting from a resin having an intrinsic viscosity I.V. of about 0.6 dl/g. The use of higher reactor temperatures will lead to the COPETs sticking in the reactor and the interruption of the production process.

With the process according to the invention it is possible to obtain the same increase of I.V. with a residence time in the polycondensation reactor of only 2–5 hours, with an increase of the productivity of the production plant.

The process according to the invention may be performed continuously, that is without interruption between the melted-polymerisation and the blending step. In this case the extruder is fed directly with the molten low molecular weight polyester resin.

On the contrary, the extruder may be fed with solid polyester granulate produced in another plant.

The extruder is preferably connected to a high vacuum oil seal pump to maintain a vacuum higher than 2 torrs for the devolatilization of the reactive mixing and for obtaining a resin with a low content of acetaldehyde.

The optimal concentration of PMDA with respect to the polyester resin is preferably 0.1–1% by weight, but lower or higher concentration may be used as well.

The residence time in the extruder is preferably comprised between 30 and 120 sec. and the temperature of the melt is related to the polyester or copolyester melting point and to the kind of dianhydride used, and it is preferably comprised between 200° and 350° C.

To avoid random local concentration of PMDA in the melt it is advisable to dilute the PMDA with crystallized PET powder (1 part of PMDA to 5 part of PET powder). This procedure will ensure an homogeneous distribution of PMDA in the melt leading to a better reproducibility of the end product intrinsic viscosity and inhibiting the gel formation.

The reactive melt coming out of the twin screw extruder will be continuously pelletized using a commercially available underwater pelletizer system or a strand pelletizer system.

According to this invention the size of the pellets will not affect the final intrinsic viscosity.

The process according to the present invention is particularly useful in the upgrading of recycled PET from crashed bottles.

The following non-limiting examples illustrate the process of this invention.

EXAMPLE 1

20 kg/h or PET-melt (I.V.=0.57 dl/g) having a content of 90 ppm of acetaldehyde were fed continuously from the finisher of a PET-melt pilot plant to a counter rotating not intermeshing twin screw extruder with venting capability. 600 g/h of a mixture of 20% weight of pyromellitic acid dianhydride in crystallized PET-powder (I.V. of the PET powder=0.58 dl/g) were fed to the extruder using a gravimetric feeder. The test conditions were as follow:

pyromellitic acid dianhydride in the PET-melt=0.6% by weight;
screw speed: 500 RPM;
ratio length-diameter (L/D): 48
barrel temperature: 282° C.;
product melt temperature: 298°-302°;
average residence time: 35-50 sec.;
vacuum: 150-170 torrs.

A die with a single hole was used as extruder die.

A strand pelletizer was used to obtain the PET-chips, which had a cylindrical shape with a diameter of 5 mm. and a length of 5 mm., and with an intrinsic viscosity of I.V.=0.6±0.02 dl/g.

The PET chips had a an acetaldehyde content of 4.5-7.2 ppm during the test period. The I.V. of the product was constant over the test period of 2 weeks.

The melting point of the product was 256° C.

The modified PET-chips according to the present invention were then fed continuously to a solid state polycondensation pilot plant according to our European Patent Application No. EP 86830340.5. The solid state temperature was 202° C. and the residence time was 5 hours. The I.V. of the upgraded products was 1.16±0.022 dl/g. That means that the upgraded kinetic of the modified PET is: I.V./t=0.108 dl/g per hour. The product was free from gel, with an acetaldehyde content of 0.5 ppm and could be extrusion blow-molded directly to packaging containers (see example 4). In comparison, the upgrading kinetic of standard PET without modification (starting I.V.=0.57 dl/g) is at the same temperature (203° C.) 0.013 dl/g per hour.

EXAMPLE 2

The same conditions of example 1 were used, and only the amount of the pyromellitic acid dianhydride was varied in relation to the PET-melt. The results are summarized in table 1.

TABLE 1

| Test No. | Weight PMDA | Upgrading Temp. °C. | Upgrading Time h | I.V. of End Prod. (dl/g) | Kinetic (dl/g) (h) |
|---|---|---|---|---|---|
| \multicolumn{6}{l}{Intrinsic Viscosity upgrading kinetic of the modified PET in the solid state polycondensation in relation to the % weight Pyromellitic acid dianhydride (PMDA) in the PET-melt. Starting Intrinsic Viscosity = 0,62 dl/g.} ||||||
| 2.1 | 0,6% | 202 | 5 | 1,16 | 0,108 |
| 2.2 | 0,45% | 202 | 5 | 0,885 | 0,053 |
| 2.3 | 0,3% | 202 | 5 | 0,794 | 0,0348 |
| 2.4 | 0,1% | 216 | 5 | 0,78 | 0,032 |
| \multicolumn{6}{l}{Comparison Tests without PMDA starting I.V. = 0,57 dl/g} ||||||
| 2.5 | 0,00 | 202 | 5 | 0,635 | 0,013 |
| 2.6 | 0,00 | 216 | 5 | 0,685 | 0,023 |

EXAMPLE 3

These tests were performed with the same procedure of example 1. Copolyethylene terephtalate-isophtalate melt was utilize instead of polyethylene terephtalate melt. In table 2 are summarized the tests which were performed using the copolyester melt with variation of the Mol. percentage of isophtalic acid to the total acid components in the copolyethylene-terephtalate-isophtalate melt.

TABLE 2

Intrinsic Viscosity upgrading kinetic of the modified Copolyethylene - terephthalate - Isophthalate (COPET-IPA) in the solid state polycondensation.
% weight Pyromellitic acid dianhydride in the (COPET-IPA) melt = 0,6%
STARTING INTRINSIC VISCOSITY = 0,59 dl/g

| Test No. | Mol % Isophthalic acid to the total acid in (COPET-IPA) | Melting point of COPET-IPA (°C.) | Upgrading Temp. °C. |
|---|---|---|---|
| 3.1 | 7% | 234 | 181 |
| 3.2 | 10% | 227 | 181 |

| Test No. | Upgrading Time (h) | I.V. of End Product (dl/g) | Melting Point of End Product °C. | Upgrading kinetic (dl/g) (h) |
|---|---|---|---|---|
| 3.1 | 5 | 0,925 | 232 | 0,067 |
| 3.2 | 5 | 0,99 | 225 | 0,08 |

EXAMPLE 4

An upgraded PET, modified according to the invention, with an I.V.=1.16 dl/g was used to produce continuously 1 liter bottles for flat mineral water. SIDEL DSL2C blow molding machine was applied. The screw temperatures were 280° C., the blowing pressure 3.8-4.0 bars.

The bottle weight of 34.5-35.5 g was constant for the period of the test 8 h.

The bottles were transparent without gel, crystal clear and brilliant.

The bottles had a maximal vertical load 24.3-25.2 kg/cm$^2$.

The acetaldehyde content in the head-space of the bottle was 2.7 µg/l.

EXAMPLE 5

In the same conditions of EX. 4, a modified upgraded PET having an I.V.=0.79 dl/g has been used.

The bottles obtained by such resin had a maximal vertical load of 21.2÷22.3 kg/cm$^2$.

The acetaldehyde content in the head-space of the bottle was 2.4 µg/l.

EXAMPLE 6

In the same conditions of EX. 1 (upgrading temperature: 202° C.) 3,3', 4,4' benzophenone tetetracarboxylic acid dianhydride (melting point=228° C.) has been used with a concentration of 0.98% with respect to the PET resin. The I.V. after the extrusion step was 0.64 dl/g and the final I.V. (after a 5 hour polycondensation) was 1.36±0.022 dl/g. The I.V. increase versus time was 0.144 dl/gh.

EXAMPLE 7

In the same conditions of Ex. 1, only the vacuum in the extruder has been varied, and it was 20-25 Torrs during the blending of the PET resin with PMDA.

The I.V. of the modified PET after the blending in the twin screw extruder was 0.78±0.02 dl/g.

All the products shown an acetaldehyde content of less than 0.5 ppm after the solid state polycondensation upgrading.

The following table gives the values of the upgrading kinetics of the modified product.

TABLE 3

| Test No. | Upgrading temp. (°C.) time (h) | I.V. of the end product (dl/g) | Upgrading kinetic ΔI.V. / t (dl/g/h) |
|---|---|---|---|
| 7.1 | 170° - 8 h | 0,966 | 0,023 |
| 7.2 | 195° - 4 h | 1,22 | 0,110 |
| 7.3 | 202° - 3 h | 1,36 | 0,195 |

EXAMPLE 8 (COMPARISON)

In same conditions of Ex. 1 (upgrading temperature: 202° C.) three different known additives have been blended with PET.

The results of the tests are summarized in table 4 and clearly show that the upgrading kinetic is sensibly slower in comparison with the results obtained according to the present invention.

TABLE 4

| | % weight | I.V. before extrusion (dl/g) | I.V. after extrusion (dl/g) | I.V. after polycondensation (dl/g) | ΔI.V./t (dl/g) (h) |
|---|---|---|---|---|---|
| Test 8.1 Pyromellitic acid | 0,8 | 0,57 | 0,625 | 0,745 | 0,024 |
| Test 8.2 Trymellitic acid anhydride | 0,6 | 0,57 | 0,61 | 0,715 | 0,021 |
| Test 8.3 Pentaerythritol | 0,6 | 0,57 | 0,62 | 0,745 | 0,025 |

I claim:

1. A process for the continuous production of (1) high molecular weight polyester resin from (2) polyester resin which has a lower molecular weight and an intrinsic viscosity of at least about 0.6 dl/g, measured as a solution in a 60:40 weight ratio mixture of phenol and tetrachloroethane at 25° C., which process comprises blending the (2) polyester resin having the lower molecular weight in the molten state with an upgrading additive selected from the group consisting of the dianhydrides of aromatic tetracarboxylic acids, granulating the resin and subjecting the resulting granulate to upgrading treatment in the solid state for at least two hours.

2. A process according to claim 1, wherein the additive is selected from the group consisting of pyromellitic dianhydride, benzophenone dianhydride, 2,2-bis (3,4-dicarboxyphenyl) propane dianhydride, 3,3',4,4'-biphenyltetracarboxylic acid dianhydride, bis (3,4-dicarboxyphenyl) ether dianhydride, bis (3,4-dicarboxyphenyl) thioether dianhydride, bisphenol A bisether dianhydride, 2,2-bis (3,4-dicarboxylphenyl) hexafluoropropane dianhydride, 2,3,6,7-naphthalenetetracarboxylic acid dianhydride, bis (3,4-dicarboxyphenyl) sulfone dianhydride, 1,2,5,6-naphthalenetetracarboxylic acid dianhydride, 2,2',3,3'-biphenyltetracarboxylic acid dianhydride, hydroquinone bisether dianhydride, bis (3,4-dicarboxyphenyl) sulfoxide dianhydride, 3,4,9,10-perylene tetracarboxylic acid dianhydride and mixtures thereof.

3. A process according to claim 1, wherein the additive is pyromellitic dianhydride, 3,3',4,4'-benzophenonetetracarboxylic dianhydride or a mixture thereof.

4. A process according to claim 1, wherein the blending is performed in a counter-rotating non-intermeshing vented twin screw extruder.

5. A process according to claim 4, wherein the blending is at a temperature between 200° and 350° C.

6. A process according to claim 4, wherein the pressure in the extruder is below 150 torrs.

7. A process according to claim 4, wherein the temperature of the polyester in the extruder is between 200° and 350° C. and the residence time in the extruder is between 30 and 120 sec.

8. A process according to claim 1, wherein the dianhydride fed to the extruder comprises between 0.1 to 1% by weight based on the (2) polyester resin having the lower molecular weight.

9. A process according to claim 1, wherein the polyester resin is a recycled polyester resin in the form of scrap from crushed polyester bottles.

10. A process according to claim 1, wherein the upgrading is carried out at a temperature from 170° to 220° C.

11. A process according to claim 1, wherein the polyester resin is selected from the group of polyethylene terephthalate and copolyethylene terephthalate containing units derived from isophthalic acid.

12. A process according to claim 10, wherein the upgrading additive is pyromellitic dianhydride used in a quantity of from 0.1 to 1% by weight based on the polyester resin.

13. A process according to claim 11, wherein the polyester resin is blending with pyromellitic dianhydride in a counter-rotating non-intermeshing twin screw extruder at a temperature from 200° to 350° C. and the upgrading treatment is carried out at a temperature from 170° to 270° C.

* * * * *

UNITED STATES PATENT AND TRADEMARK OFFICE
CERTIFICATE OF CORRECTION

PATENT NO. : 5,243,020

DATED : September 7, 1993

INVENTOR(S) : Guido Ghisolfi

It is certified that error appears in the above-identified patent and that said Letters Patent is hereby corrected as shown below:

On title page, item [57] Abstract, should read as follows:

--ABSTRACT

A process for the fast upgrading of a PET resin involves the extrusion of a low molecular weight PET with a dianhydride of an aromatic tetracarboxylic acid. The molten product is pelletized and fed to a solid state polycondensation reactor.--

At column 5, just after "TABLE 4" insert the following:

-- The intrinsic viscosities have been determined on a solution of 0,5 g. of polyester pellets into 100 ml of solution phenol/tetrachloroethane with a weight ratio of 60:40 at a temperature of 25°C. The free acetaldehyde content has been determined with gas chromatographic methods previously described in DE-OS 2834 162.

The content of the acetaldehyde within the container ("head-space methods") has been determined using the method described in U.S. Pat. No. 4,764,323.--

Column 1, line 11, delete "adapted" and insert therefor --suitable--; and line 14, after "known" insert --from--.

UNITED STATES PATENT AND TRADEMARK OFFICE
CERTIFICATE OF CORRECTION

PATENT NO. : 5,243,020
DATED : September 7, 1993
INVENTOR(S) : Guido Ghisolfi

It is certified that error appears in the above-indentified patent and that said Letters Patent is hereby corrected as shown below:

Column 6, line 49, delete "blending" and insert --blended--

Signed and Sealed this

Fourteenth Day of June, 1994

Attest:

BRUCE LEHMAN

Attesting Officer

Commissioner of Patents and Trademarks